United States Patent
Hong et al.

(10) Patent No.: US 12,536,820 B2
(45) Date of Patent: Jan. 27, 2026

(54) TEMPLATE BASED TEXT RESTORATION

(71) Applicant: Samsung Electronics Co., Ltd., Suwon-si (KR)

(72) Inventors: Hunsop Hong, Irvine, CA (US); Seongnam Oh, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 18/496,305

(22) Filed: Oct. 27, 2023

(65) Prior Publication Data
US 2024/0153293 A1    May 9, 2024

Related U.S. Application Data

(60) Provisional application No. 63/424,074, filed on Nov. 9, 2022.

(51) Int. Cl.
*G06V 30/12*    (2022.01)
*G06F 40/242*    (2020.01)
*G06T 5/00*    (2024.01)
*G06T 5/70*    (2024.01)

(52) U.S. Cl.
CPC .......... *G06V 30/133* (2022.01); *G06F 40/242* (2020.01); *G06T 5/70* (2024.01)

(58) Field of Classification Search
CPC ........ G06V 30/133; G06F 40/242; G06T 5/70
See application file for complete search history.

(56) References Cited

U.S. PATENT DOCUMENTS

| 10,789,696 B2 | 9/2020 | Po et al. | |
| 2010/0128141 A1 | 5/2010 | Jang | |
| 2015/0161100 A1* | 6/2015 | Bhatnagar | G06N 5/00 |
| | | | 704/10 |
| 2020/0175304 A1* | 6/2020 | Vig | G06F 16/24522 |

FOREIGN PATENT DOCUMENTS

| CN | 106940798 A | 7/2017 |
| CN | 105913093 B | 6/2019 |
| CN | 114861674 A | 8/2022 |
| CN | 115761277 A | 3/2023 |

OTHER PUBLICATIONS

NPL: Results Publication Date Range: Mar. 1, 2012 to Jul. 22, 2025.*

* cited by examiner

*Primary Examiner* — Quang N Vo
(74) *Attorney, Agent, or Firm* — Sherman IP LLP; Kenneth L. Sherman; Steven Laut

(57) ABSTRACT

One embodiment provides a computer-implemented method that includes comparing, by a computing device, an input character signal with one or more prestored character templates for determining an estimated difference measure. The computing device, based on the estimated difference measure, determines one or more mixing weights between a stored character patch buffer and a current input character patch for determining an output mixing patch. The computing device further updates the character patch buffer based on the output mixing patch. The computing device additionally substitutes a designated area using the output mixing patch to produce a final output.

20 Claims, 5 Drawing Sheets

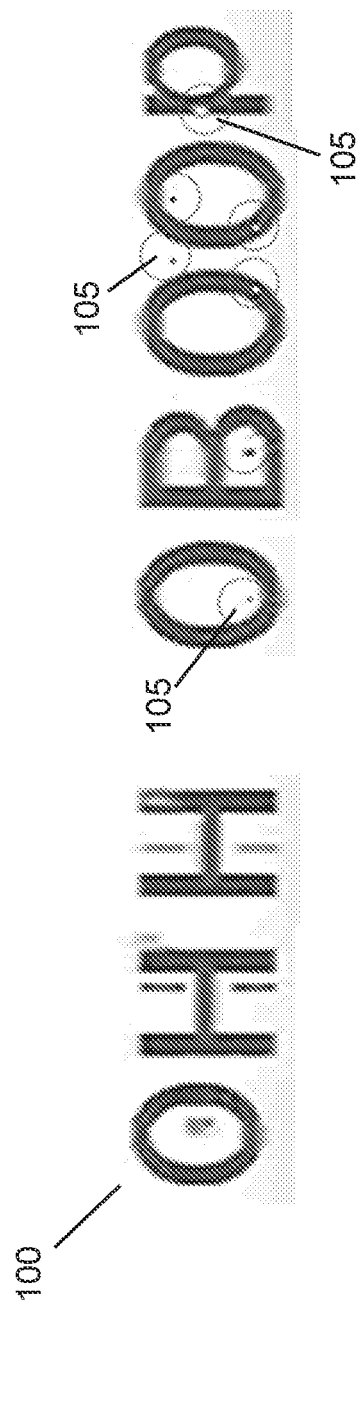
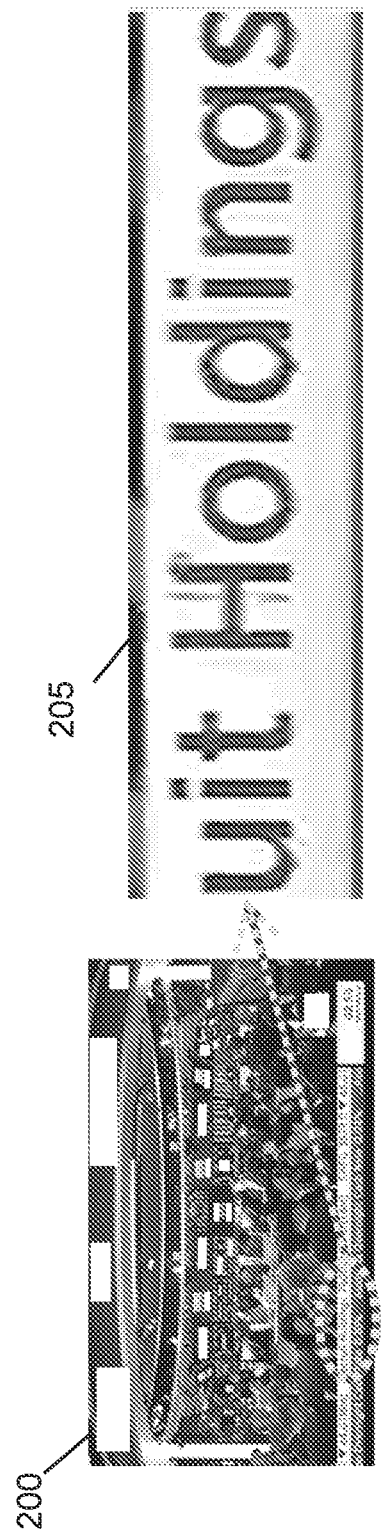
FIG. 1
FIG. 2

TEMPLATE BASED TEXT RESTORATION

CROSS-REFERENCE TO RELATED APPLICATIONS

This application claims the priority benefit of U.S. Provisional Patent Application Ser. No. 63/424,074, Nov. 9, 2022, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to image artifacts, and in particular, to a restoration mechanism of a broken source with a priori information.

BACKGROUND

Various artifacts can be added to a source signal for various reasons, which results in a degradation of the source picture quality. Often times, restoration of the source picture quality with distorted source content is based on stochastic approaches-central limit theorem, which may be a practical way to restore the original signal. However, restoration can fail especially where the noise power is significantly stronger than signal power.

SUMMARY

One embodiment provides a computer-implemented method that includes comparing, by a computing device, an input character signal with one or more prestored character templates for determining an estimated difference measure. The computing device, based on the estimated difference measure, determines one or more mixing weights between a stored character patch buffer and a current input character patch for determining an output mixing patch. The computing device further updates the character patch buffer based on the output mixing patch. The computing device additionally substitutes a designated area using the output mixing patch to produce a final output.

Another embodiment includes a non-transitory processor-readable medium that includes a program that when executed by a processor performs broken text source restoration for a display, including comparing, by the processor, an input character signal with one or more prestored character templates for determining an estimated difference measure. The processor, based on the estimated difference measure, determines one or more mixing weights between a stored character patch buffer and a current input character patch for determining an output mixing patch. the processor updates the character patch buffer based on the output mixing patch. Additionally, the processor substitutes a designated area using the output mixing patch to produce a final output.

Still another embodiment provides an apparatus that includes a memory storing instructions, and at least one processor executes the instructions including a process configured to compare an input character signal with one or more prestored character templates for determining an estimated difference measure. The process further determines, based on the estimated difference measure, one or more mixing weights between a stored character patch buffer and a current input character patch for determining an output mixing patch. The process still further updates the character patch buffer based on the output mixing patch. Additionally, the process substitutes a designated area using the output mixing patch to produce a final output.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 1 illustrates an example of a textual image with image artifacts;

FIG. 2 illustrates an example of broken text in a scrolling text area of a display;

DETAILED DESCRIPTION

Figure 3:
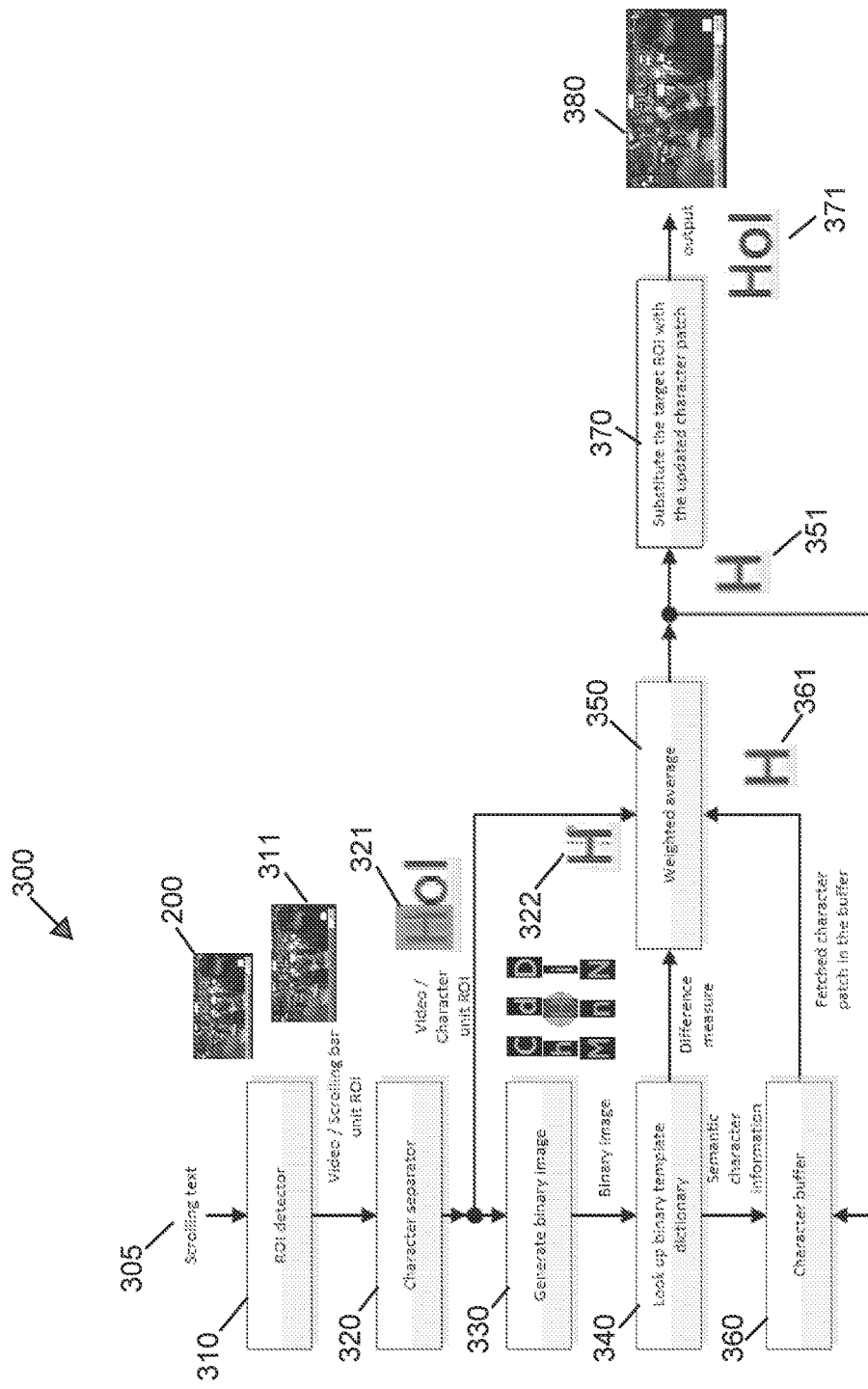
FIG. 3 illustrates a block diagram of a process for broken character restoration, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to image artifacts, and in particular, to a restoration mechanism of a broken source with a priori information. One embodiment provides a computer-implemented method that includes comparing, by a computing device, an input character signal with one or more prestored character templates for determining an estimated difference measure. The computing device, based on the estimated difference measure, determines one or more mixing weights between a stored character patch buffer and a current input character patch for determining an output mixing patch. The computing device further updates the character patch buffer based on the output mixing patch. The computing device additionally substitutes a designated area using the output mixing patch to produce a final output.

In some embodiments, the disclosed technology provides a way to restore a severely broken scrolling text area in broadcasts and over-the-top (OTT) environments by using a template dictionary to provide a difference measure for an input character image patch. In one or more embodiments, using the measure, the degree of signal quality is measured, and the desired output is generated with input signals by adaptively selecting the input signals based on the measure using template dictionary. Some embodiments include a comparison process for the pre-stored character template dictionary. One or more embodiments include using the estimated difference measure in the comparison process for determining mixing weight between a stored character patch buffer and a current input character patch. Adaptive mixing processing assigns a high weight for a good input and a low weight for a bad input. Some embodiments include the feature that the output mixing patch between the patch buffer and the input is used for updating the character patch buffer. Additionally, the output mixing patch is used for the final output by substituting the designated area. One or more embodiments provide that the prestored character template dictionary is generated using the region-of-interest (ROI) detector and character separator function in a system. The output, after passing those functions, are character patches with various errors. The template dictionary may be made by a manual selection of the given character patches.

FIG. 1 illustrates an example of a textual image 100 with image artifacts 105. Restoration in the example failed due to the noise power being significantly stronger than signal power. The artifacts 105 are usually incurred by the logic defects in a processing unit in the source, such as frame rate conversion and de-interlacing, etc.

FIG. 2 illustrates an example of broken text 205 in a scrolling text area of a display 200. Conventional signal processing methods are based on stochastic approaches. One basic assumption of the stochastic approaches is that the power of a signal is greater than that of noise, and it is quite a common situation. While broadcasting, various format conversions are performed in order to accommodate various broadcasting environments. For example, a frame rate conversion process will be performed for matching different frame rates and deinterlacing will be performed for matching a progressive/interlaced format. Those operations are accompanied by undesired side effects caused by logic defects (coverage limitation of an algorithm due to exceeding an algorithm capability) and some of the worst case (coverage limitation of contents due to a noise signal being too strong), the noise power is significantly stronger than the signal power. In such cases, the noise is unable to be removed using conventional stochastic based approaches. However, some limited cases, such as the artifacts in a scrolling text banner bar, can be successfully removed with some a priori information since the scrolling text banners often have both a correct and an incorrect signal. In some embodiments, a novel way is described in order to remove artifacts and restore picture quality in a scrolling banner area with a priori information.

FIG. 3 illustrates a block diagram of a process 300 for broken character restoration, according to some embodiments. In one or more embodiments, the input includes scrolling text 305 obtained from a screen image 200 on a display showing the content (e.g., video content, streaming content, etc.). The ROI detector 310 detects the targeted scene 311 (video/scrolling bar unit ROI), which is the ROI on the display 200. With the detected ROI, the character separator unit 320 provides ROI separation. The character separator unit 320 ROI patch (e.g., video/character unit ROI 321) is attained and a character 322 is input to the weighted average unit 350 and block 330 that performs the generate binary image process. The generate binary image process in block 330 generates a binary image for searching a template dictionary. In block 340 processing for looking up the dictionary with the binary patch is performed for finding a matching character. Block 340 also provides a matching/difference measure, which determines whether to use the signal as a "good" signal or "bad" signal. The difference measure is input to block 350 that performs a weighted average. The semantic character information from block 340 is input to the character buffer 360. In some embodiments, if the given patch is considered "good," which is decided by the difference measure such as a sum of the absolute difference (SAD; a statistical variable that is used to determine the deviation of the measured values of two series) with given dictionary, the patch is combined with the character buffer 360 with high weight, otherwise it is combined with the character buffer 360 with low weight. The resulting image patch is used for updating the character buffer from block 350. For a no-match case, block 360 is skipped. In block 370, the output character patch is also used for the substitution of the target area detected by the ROI detector 310. The output 371 from block 370 is used for the final screen image 380 for the display.

Figure 4:
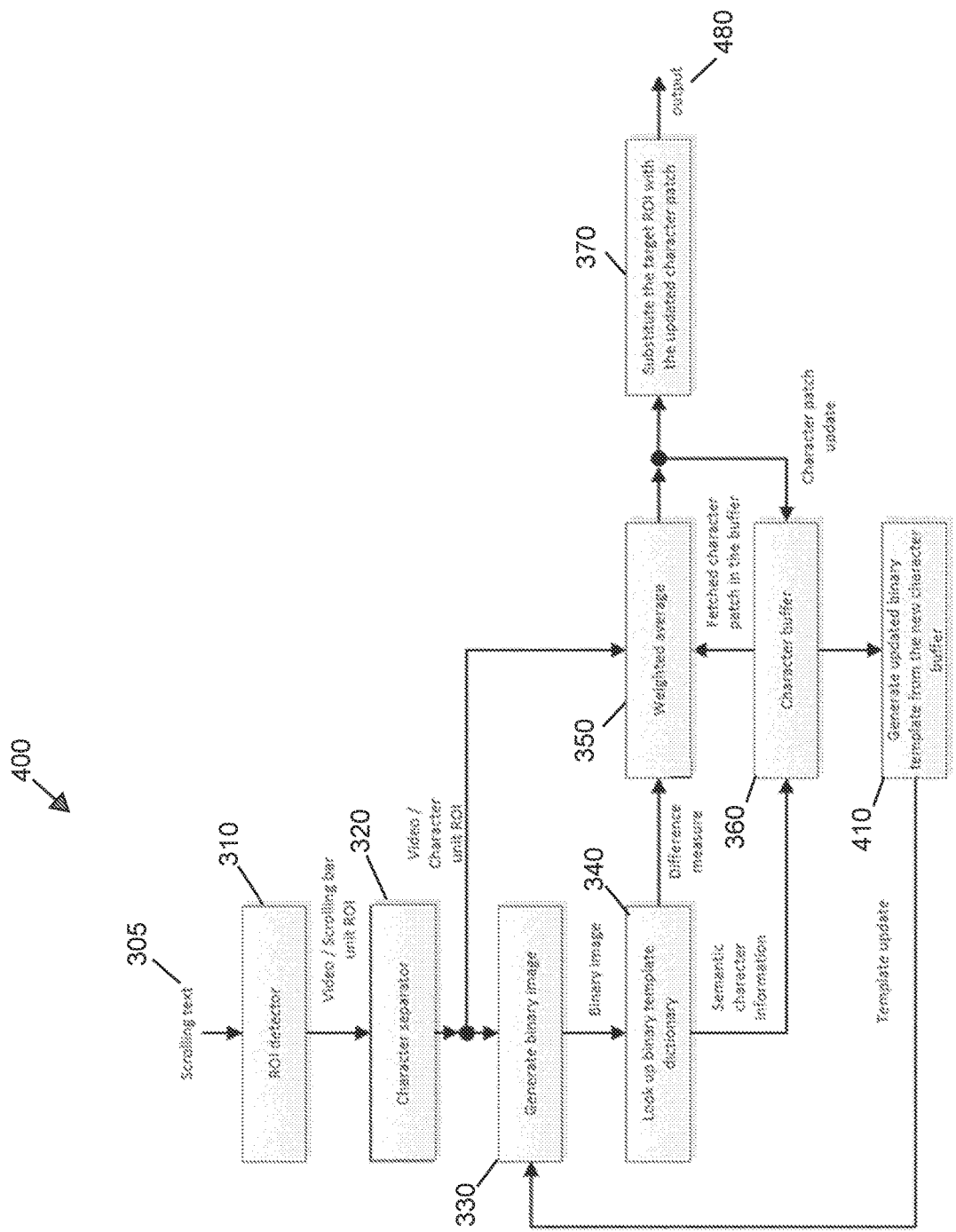
FIG. 4 illustrates a block diagram of another process for broken character restoration, according to some embodiments.

FIG. 4 illustrates a block diagram of another process 400 for broken character restoration, according to some embodiments. In one or more embodiments, process 300 (FIG. 3) cannot handle an out-of-dictionary (template dictionary) case. In order to handle those out-out-dictionary case, template update logic can be added. In some embodiments, if the difference measure from block 340 (processing for looking up the dictionary with the binary patch is performed for finding a matching character) is greater than a certain threshold, the difference measure can be considered as an out-of-dictionary/no-match case. In this out-of-dictionary case, in one or more embodiments the input from character buffer 360 may be ignored and a new buffer for the new character can be assigned from the given input character patch. After the new buffer is assigned, a new binary template from the character buffer 360 may be generated and used for updating the dictionary. Once the character buffer 360 for the input patch is finished, a new binary template for the dictionary may be generated from the character buffer 360. It should be noted that the color template may also be used. It will, however, increase the dictionary size and, moreover, the binary image has an essential part of the character itself. In example images 520 and 530 (FIG. 5), the white background with black characters above and the dark background with white characters below may share the same database. Additionally a logo may be processed in a similar way by the ROI detector 310 and the character separator unit 320.

In some embodiments, the process 400 includes block 410 that generates the updated binary template from the new character buffer 360 and provides the template update to block 330 that performs the generate binary image process.

In block 370, the updated character patch is also used for the substitution of the target area detected by the ROI detector 310. The output 480 from block 370 is used for the final screen image for the display.

Figure 5:
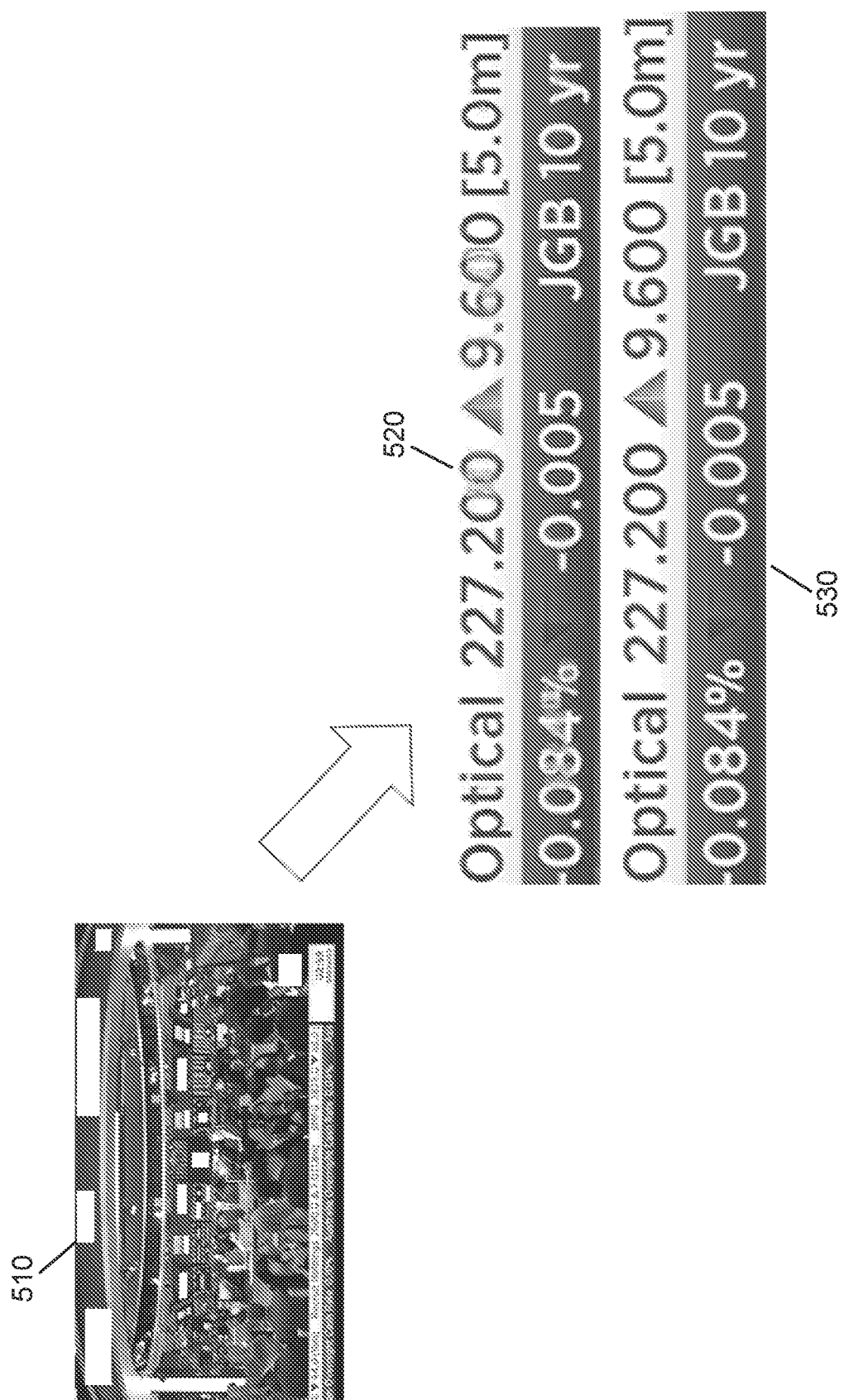
FIG. 5 illustrates an example of input and output comparison for a broken source, according to some embodiments.

FIG. 5 illustrates an example of input 520 and output 530 comparison for a broken source 510, according to some embodiments. One or more embodiments provides a way to restore the broken captions in scrolling text area of news channels on by selecting good characters from the inputs. As shown, the input text 520 includes artifacts as the output 530 text from one or more embodiments restores the text with artifacts removed.

Figure 6:
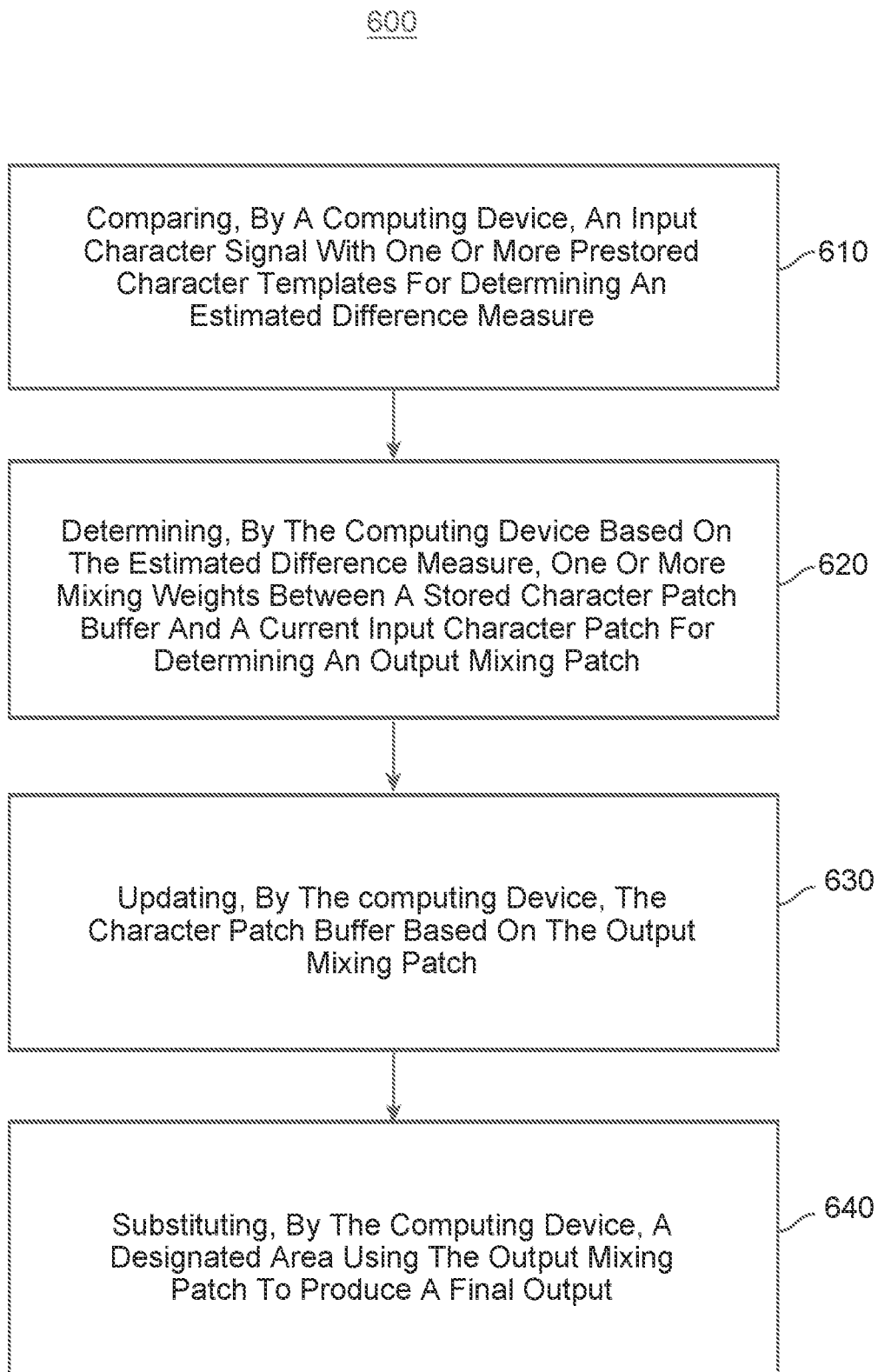
FIG. 6 illustrates a process for broken character source restoration, according to some embodiments.

FIG. 6 illustrates a process 600 for broken character source restoration, according to some embodiments. In block 610, process 600 performs, by a computing device (e.g., a computing processor/multiprocessor, etc.), a comparison of an input character signal with one or more prestored character templates for determining an estimated difference measure. In block 620, process 600 performs, by the computing device, a determination based on the estimated difference measure, one or more mixing weights between a stored character patch buffer and a current input character patch for determining an output mixing patch. In block 630, process 600 performs, by the computing device, an update of the character patch buffer based on the output mixing patch. In block 640, process 600 performs, by the computing device, substitution of a designated area using the output mixing patch to produce a final output.

In some embodiments, process 600 includes the feature that the one or more prestored character templates are utilized for measuring quality of the input character signal, and the one or more prestored character templates are stored in a dictionary (e.g., a template dictionary, etc.).

In one or more embodiments, process 600 further provides that the determination of the mixing weight includes performing an adaptive mixing process for assigning a first weight for good input and second weight for bad input.

In one or more embodiments, process 600 further provides that the character patch buffer construction comprises input character patches.

In some embodiments, process 600 additionally provides the feature that the character patch buffer is utilized for reconstructing clean output from the input character patches for minimizing a possible discrepancy between the one or more prestored character templates and the input character patches.

In one or more embodiments, process 600 further provides that processing all pixels globally based on the luminance statistics.

In some embodiments, process 600 further provides identifying, by the computing device, an out-of-dictionary scenario, excluding input data for the out-of-dictionary scenario, and applying one or more stochastic-based approaches for automatically updating the dictionary.

In one or more embodiments, process 600 additionally includes the feature that in the out-of-dictionary scenario for a particular input character patch, a new character input patch is stored, and the one or more stochastic-based approaches are applied with sufficient frames for generating a clean character image.

In some embodiments, the disclosed technology prepares pre-stored character templates for measuring quality of input character signal: utilizing a matching measurement from a pre-stored template for character reconstruction, where the update amount applied to an output buffer is based on a matching measurement. One or more embodiments provide a character buffer constructed by input character patches: using the buffer to reconstruct a clean output from input character patches instead of from a prestored template, in order to minimize any discrepancy between the template and pre-stored character patches. Some embodiments provide for identifying an out-of-dictionary scenario and exclusion of input data for an out-of-dictionary scenario but applies one or more stochastic-based approaches to automatically update the dictionary.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
   comparing, by a computing device, an input character signal with one or more prestored character templates for determining an estimated difference measure;
   determining, by the computing device based on the estimated difference measure, one or more mixing weights between a stored character patch buffer and a current input character patch for determining an output mixing patch;
   updating, by the computing device, the character patch buffer based on the output mixing patch; and
   substituting, by the computing device, a designated area using the output mixing patch to produce a final output.

2. The method of claim 1, wherein:
   the one or more prestored character templates are utilized for measuring quality of the input character signal; and the one or more prestored character templates are stored in a dictionary.

3. The method of claim 1, wherein the determination of the mixing weight comprises performing an adaptive mixing process for assigning a first weight for good input and second weight for bad input.

4. The method of claim 1, wherein the character patch buffer construction comprises input character patches.

5. The method of claim 4, wherein the character patch buffer is utilized for reconstructing clean output from the input character patches for minimizing a possible discrepancy between the one or more prestored character templates and the input character patches.

6. The method of claim 2, further comprising:
identifying, by the computing device, an out-of-dictionary scenario; and
excluding, by the computing device, input data for the out-of-dictionary scenario and applying one or more stochastic-based approaches for automatically updating the dictionary.

7. The method of claim 6, wherein in the out-of-dictionary scenario for a particular input character patch, a new character input patch is stored and the one or more stochastic-based approaches are applied with sufficient frames for generating a clean character image.

8. A non-transitory processor-readable medium that includes a program that when executed by a processor performs broken text source restoration for a display, comprising:
comparing, by the processor, an input character signal with one or more prestored character templates for determining an estimated difference measure;
determining, by the processor based on the estimated difference measure, one or more mixing weights between a stored character patch buffer and a current input character patch for determining an output mixing patch;
updating, by the processor, the character patch buffer based on the output mixing patch; and
substituting, by the processor, a designated area using the output mixing patch to produce a final output.

9. The non-transitory processor-readable medium of claim 8, wherein:
the one or more prestored character templates are utilized for measuring quality of the input character signal; and
the one or more prestored character templates are stored in a dictionary.

10. The non-transitory processor-readable medium of claim 8, wherein the determination of the mixing weight comprises performing an adaptive mixing process for assigning a first weight for good input and second weight for bad input.

11. The non-transitory processor-readable medium of claim 8, wherein the character patch buffer construction comprises input character patches.

12. The non-transitory processor-readable medium of claim 11, wherein the character patch buffer is utilized for reconstructing clean output from the input character patches for minimizing a possible discrepancy between the one or more prestored character templates and the input character patches.

13. The non-transitory processor-readable medium of claim 9, further comprising:
identifying, by the processor, an out-of-dictionary scenario; and
excluding, by the processor, input data for the out-of-dictionary scenario and applying one or more stochastic-based approaches for automatically updating the dictionary.

14. The non-transitory processor-readable medium of claim 13, wherein in the out-of-dictionary scenario for a particular input character patch, a new character input patch is stored and the one or more stochastic-based approaches are applied with sufficient frames for generating a clean character image.

15. An apparatus comprising:
a memory storing instructions; and
at least one processor executes the instructions including a process configured to:
compare an input character signal with one or more prestored character templates for determining an estimated difference measure;
determine, based on the estimated difference measure, one or more mixing weights between a stored character patch buffer and a current input character patch for determining an output mixing patch;
update the character patch buffer based on the output mixing patch; and
substitute a designated area using the output mixing patch to produce a final output.

16. The apparatus of claim 15, wherein:
the one or more prestored character templates are utilized for measuring quality of the input character signal; and
the one or more prestored character templates are stored in a dictionary.

17. The apparatus of claim 15, wherein the determination of the mixing weight comprises performing an adaptive mixing process for assigning a first weight for good input and second weight for bad input.

18. The apparatus of claim 15, wherein the character patch buffer construction comprises input character patches.

19. The apparatus of claim 18, wherein the character patch buffer is utilized for reconstructing clean output from the input character patches for minimizing a possible discrepancy between the one or more prestored character templates and the input character patches.

20. The apparatus of claim 17, further comprising:
identifying an out-of-dictionary scenario; and
excluding input data for the out-of-dictionary scenario and applying one or more stochastic-based approaches for automatically updating the dictionary;
wherein in the out-of-dictionary scenario for a particular input character patch, a new character input patch is stored and the one or more stochastic-based approaches are applied with sufficient frames for generating a clean character image.

* * * * *